Patented Oct. 18, 1932

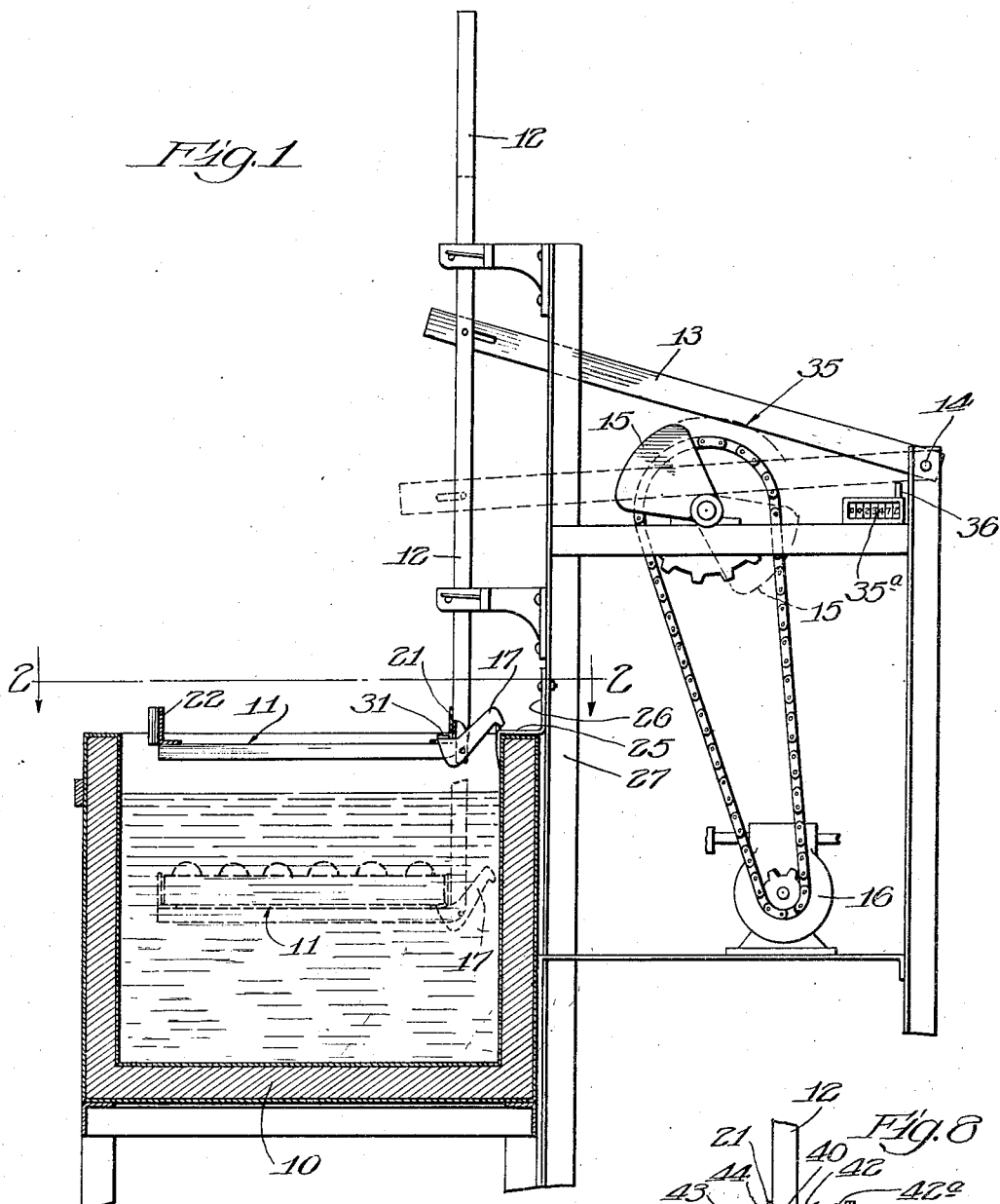
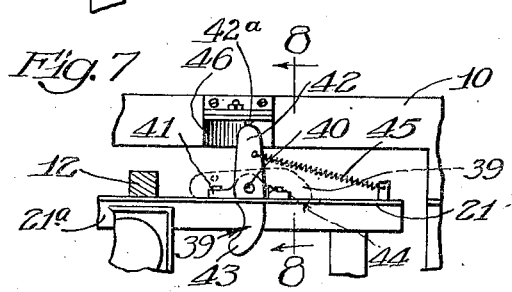
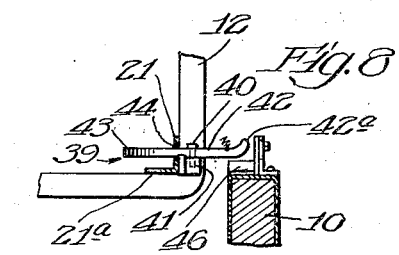

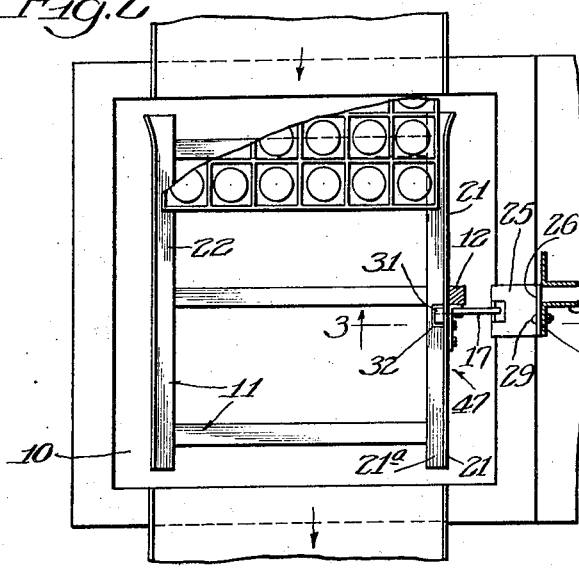
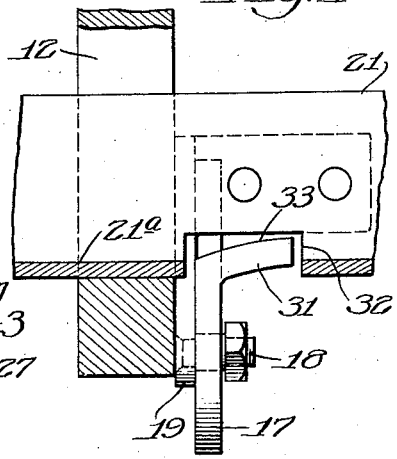
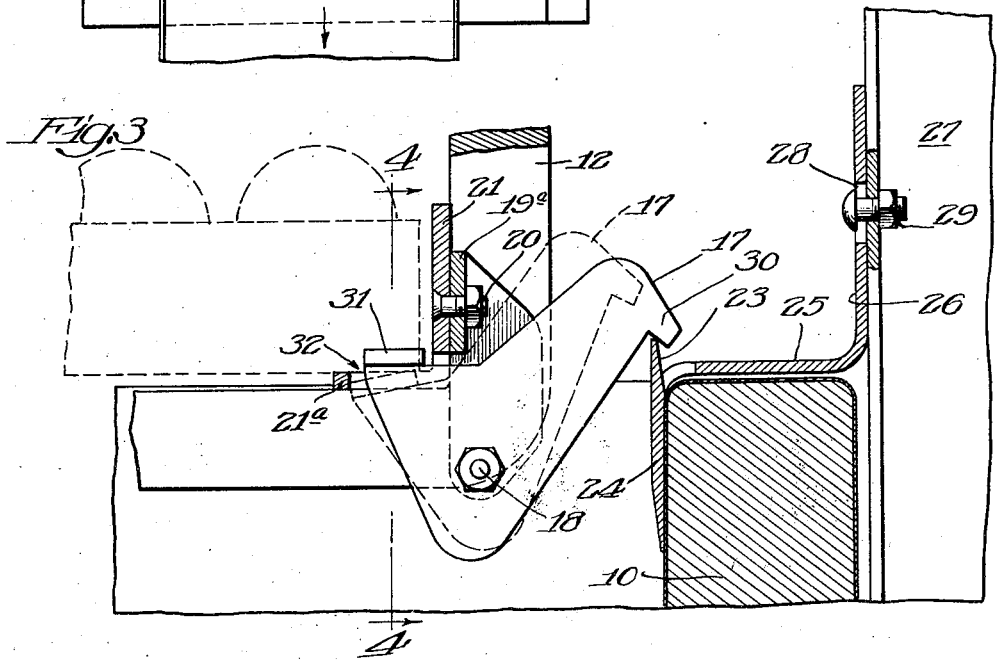
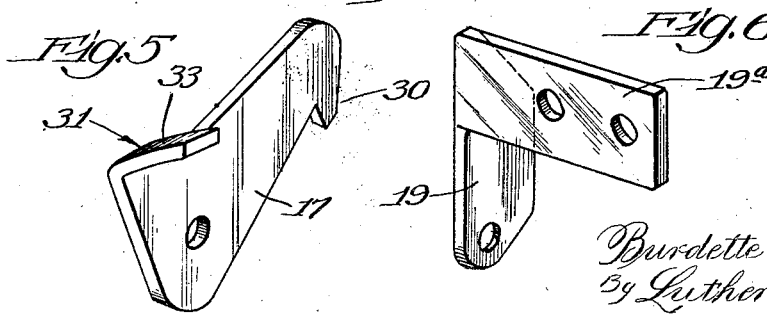

1,883,669

UNITED STATES PATENT OFFICE

BURDETTE E. FORD, OF CHICAGO, ILLINOIS, ASSIGNOR TO THE STEROLENE COMPANY, OF CHICAGO, ILLINOIS, A CORPORATION OF ILLINOIS

EGG TREATING MACHINE

Application filed January 31, 1931. Serial No. 512,571.

These improvements relate to egg-treating machines, with more particular reference to means thereof for controlling the operation of the egg-dipping mechanism.

It is old to treat eggs by dipping a tray or rack containing say thirty-six of them into a vat or tank of heated oil by means comprising a carrier upon which the tray is slid from adjoining guide means, the carrier being vertically reciprocated with a constant movement, the tray of treated eggs being slid off of the carrier at the top of the carrier stroke, a tray of untreated eggs being substantially simultaneously slid into its place, and the operation thus repeated.

It frequently happens that there is delay in getting a tray upon the dipping carrier, due sometimes to a failure of the supply of trays containing eggs at the treating station. Congestion of treated eggs in the ways beyond the dipping station may cause delay. The result has been that many reciprocations of the carrier are lost to service, and production thus reduced. The operator, too, will frequently try to apply a tray of eggs to the carrier after it has started to descend and spillage and breakage of eggs occurs in the tank.

The prime objects of the present invention are to increase production, to promote safety to the product and to the preservative, to render much more easy and convenient the operator's work, to avoid the objectionable cooling of the liquid by repeated and useless insertions of the carrier when empty, to save power, and to provide a machine whereby the actual egg-treating operations may be counted mechanically; and it is an object to accomplish such advantages by simple means.

In the drawings Figure 1 is a fragmentary elevation of a machine of well-known construction except for the feature of improvement added thereto, the tank being shown in section and the dotted line position showing how a tray of eggs on the platform is immersed in the treating liquid; Fig. 2 is a sectional view as on the line 2—2 of Fig. 1; Fig. 3 is an enlarged sectional view as on the line 3—3 of Fig. 2 showing the latching device in preferred form of these improvements; Fig. 4 is a sectional view as on the line 4—4 of Fig. 3; Fig. 5 is a perspective of the latch of the preceding figures; Fig. 6 is a perspective of the bracket for holding said latch for pivotal movements; Fig. 7 is a fragmentary top view showing a modification; and Fig. 8 is a fragmentary sectional view as on the line 8—8 of Fig. 7.

Turning to Fig. 1, it may be assumed for present purposes that the tank or receptacle 10 for heated oil, the carrier platform 11, the vertically reciprocating bar 12 rigidly connected to and holding the platform 11, the arm 13 pivoted at 14 and the cam 15 constantly rotated by a pulley on the speed-reducing mechanism 16 in turn operated by a motor, are severally and collectively old and well-known.

In the following description of the device shown the term carrier is to be understood as including the platform 11 and the upright bar 12, and that the mechanism or means for reciprocating the carrier include the cam 15 and the lever bar 13.

These improvements provide means for holding the carrier in raised position until a tray of eggs is normally moved upon it. The preferred embodiment of these means includes the latch 17, a lever of the first class, held pivotally by the bolt 18 to the bracket 19 having a part 19a secured by bolts 20 to the vertical web 21 of a section of angle iron constituting one of the ways or guides for the tray of eggs on the platform 11. The cooperating oppositely-disposed angle iron guide is marked 22, Figs. 1 and 2. The latch 17 therefore moves up and down with the platform 11. A catch in the form of a lip 23 is shown as being formed out of a piece of flat metal having a part 24 extending downward against the inner surface of the rear vertical wall of the tank construction 10, having a part 25 extending over the top of the tank wall, and a vertical part 26 extending along the frame part 27 of the machine. This part 26 is provided with a slot 28, and a bolt 29 holds the catch member for vertical adjustments. Such vertical adjustments may be called for in the initial assembly to insure the suspended position of the platform 11 at the desired elevation with respect to the ways for egg trays leading to and from the platform.

The latch 17 has a lip or projection 30 engaging the catch 23. When so engaged the carrier is maintained suspended by the latch. The latch has a rear extension 31 which projects upward through a rectangular opening at 32 in the horizontal web 21a of the angle iron guide member. The trays of eggs slide on this horizontal web 21a. Fig. 4 shows that the foot-like extension 31 has a top surface 33 inclining upwardly from the plane of the top surface of the angle iron part 21a. As viewed in that figure the trays are moved to the right. When a tray so moved encounters the foot or extension 31 the tray may slide upward thereon or it may at once cause the foot 31 to descend, due to such part of the weight of the eggs and the tray as is communicated to this foot or latch extension 31.

The latch 17 is considerable heavier at the catch end thereof than at the end 31 thereof, as will be clear from Fig. 3. This heavier end tends gravitationally to maintain the locked relation at the end of the upward movement of the carrier. The weight of the eggs in the tray moves the end 31 downward and the heavier end upward against the gravitational force acting upon it, and the amount of downward movement of the extension is such as to move the other end clear of the catch 23 whereby the carrier may descend.

The carrier descends gravitationally when the arcuate part of the cam 15 begins to move away from the bar 13. On the next revolution of the cam 15 the bar 13 is raised, elevating the carrier, and the carrier is maintained elevated during the passage of the arcuate part of the cam in contact with the bar 13.

In this connection attention is called to the dotted line 35 in Fig. 1 showing the path of this arcuate part of the cam 15. This path is slightly above the lower surface of the bar 13 where the cam contacts the bar. The bar 13 and therefore the carrier are severally elevated slightly on each revolution of the cam. The latch and catch devices are preferably so arranged that the carrier is at a slightly lower elevation than that of the adjacent ways when held by the latch, and this slight upward movement of the carrier brings it to the level of the adjacent ways. This slight upward movement does not disengage the latch 17, which gravitationally maintains its holding position, but it frees the latch of frictional contact with the catch, so that a small amount of weight communicated to the foot or extension 31 of the latch will release the latch from holding position. It also avoids refinements in construction and arrangement of the latch features.

According to this construction the platform will not descend empty, but will remain elevated indefinitely and until another tray of eggs is normally moved upon the platform. The operator does not find the platform going down when he is in the act of sliding a tray of eggs upon it. No matter what the delay may be the platform is there waiting to receive another charge. The operator always removes at once the tray of eggs just treated as he does not desire to give the product a second immersion. On removing such tray the platform becomes locked in raised position since the latch merely falls over into engagement with the catch, and in this connection it is pointed out that the slightly raised position of the carrier at this time provides for a free gravitational movement of the latch into holding position.

In this connection I may refer to the counting device $35^a$ (Fig. 1) having the movable member 36 pushed downward by the rod 13 to register a unit each time the bar 13 descends. Since that bar descends only when there is a tray of eggs normally being treated the present invention provides a machine whereby the eggs treated may be mechanically counted. This is something which has been attempted heretofore, but without success owing to the fact that many reciprocations of the empty carrier were all the time occurring and counting the reciprocations was therefore useless.

Turning to Figs. 7 and 8, this modification shows a latch 39, also in the form of a lever of the first class, pivoted at 40 on a bracket 41 secured to the vertical web 21 of the angle iron shown in other figures, the latch having a holding end 42 and an operating end 43, the web 21 of the angle iron being slotted at 44 to receive the operating end 43, there being a spring 45 to maintain the latch yieldingly in the position shown in Fig. 7, the arrangement being such that when a tray of eggs is moved against the end 43 of the latch and the movement is continued the other end of the latch is moved out of overlying engagement with the rest 46, or into its dotted line position in Fig. 7, and the carrier may descend. The inner end of the latch is preferably rounded at 42a so that if it should come into engagement with an inner wall of the tank it will ride easily thereon. This latch 39 is held out of engagement with the wall of the tank by the tray of eggs on the carrier and moves into holding position by spring tension when the treated tray is removed at the top of the stroke. This latch 39 is positioned preferably beyond the vertical rod 12, say at about the place marked 47 in Fig. 2, so that the tray will be well upon the platform before the holding device is released. The slightly extending upward movement of the carrier at the end of the upward stroke is advantageous in this construction also since it admits of the free and easy overlapping movement of the catch 39 with the rest or support 46.

I contemplate as being included in the improvements herein set forth all such changes, departures and modifications from what is thus specifically illustrated and described as fall within the scope of the appended claims.

I claim:

1. In an egg-treating machine of the character described, the combination of an egg carrier mounted for vertically-reciprocating movements and adapted to hold a tray of eggs, with means for moving the carrier with constantly reciprocating movements, and means under the control of the weight of a tray of eggs on said carrier for rendering the carrier-reciprocating means operative to reciprocate the carrier.

2. In an egg-treating machine of the character described, the combination of an egg carrier mounted for vertically-reciprocating movements and adapted to hold a tray of eggs, with means for moving the carrier with constantly reciprocating movements, and latch means under the control of the weight of a tray of eggs normally on the carrier for rendering the carrier-reciprocating means operative to reciprocate the carrier.

3. In an egg-treating machine of the character described, the combination of an egg carrier mounted for vertically-reciprocating movements and adapted to hold a tray of eggs, with means for moving the carrier with constantly reciprocating movements, and means including a latch under the control of the weight of a tray of eggs on the carrier for rendering the carrier-reciprocating means operative to reciprocate the carrier.

4. In an egg-treating machine of the character described the combination of a carrier upon which a tray of eggs may be slid horizontally, the carrier being mounted for reciprocating movement, with means for moving the carrier with such movements constantly, and latching means including a part projecting into the path of the sliding movement of a tray normally moved upon the carrier and adapted to be engaged by such tray of eggs for rendering the carrier-reciprocating means operative to reciprocate the carrier.

5. In an egg-treating machine of the character described the combination of an egg carrier mounted for vertically-reciprocating movements and adapted to hold a tray of eggs, with means for moving the carrier with constantly reciprocating movements, a latch having a hook part at one end carried by the carrier, and catch means carried by a relatively fixed part for engaging the hook part to hold the carrier in normally raised position, the latch having an extension into the path of movement of a tray of eggs normally moved onto the carrier for releasing the hook part from the catch means when the tray of eggs normally engages said extension of the latch.

6. In an egg-treating machine of the character described the combination of an egg-carrier mounted for vertically-reciprocating movements and adapted to hold a tray of eggs, with means for moving the carrier with constantly reciprocating movements, latch means for holding the carrier in normally raised position and free of reciprocating movements while the means for reciprocating the carrier are normally in operation, the latch means including a part extending into the path of a tray of eggs moved onto the carrier, the arrangement providing that the latch means are released under the influence of the weight of the tray of eggs, the means for reciprocating the carrier being adapted periodically to raise the carrier slightly above its position when held by the latch means whereby the latch means are freed for release by the weight of the tray of eggs.

7. The combination of claim 5 hereof wherein the carrier-reciprocating means are adapted periodically to raise the carrier slightly above its normally raised position.

BURDETTE E. FORD.